United States Patent
Nir

Patent Number: 6,160,652
Date of Patent: Dec. 12, 2000

[54] OPTICAL ADDRESS DECODER

[75] Inventor: David Nir, Tel Aviv, Israel

[73] Assignee: Lynx Photonic Networks Ltd., Rosh Ha'ayin, Israel

[21] Appl. No.: 09/118,372

[22] Filed: Jul. 17, 1998

[51] Int. Cl.⁷ .............................. H04J 14/08; H04B 10/12
[52] U.S. Cl. .......................... 359/138; 359/135; 359/173
[58] Field of Search .................................... 359/135, 138, 359/188, 195

[56] References Cited

U.S. PATENT DOCUMENTS

| | | | |
|---|---|---|---|
| 5,002,350 | 3/1991 | Dragone | 350/96.15 |
| 5,477,364 | 12/1995 | Pearson | 359/139 |
| 5,712,937 | 1/1998 | Asawa et al. | 385/49 |

Primary Examiner—Leslie Pascal
Assistant Examiner—M. R. Sedighjan
Attorney, Agent, or Firm—Mark M. Friedman

[57] ABSTRACT

An optical address decoder, and an associated method for routing optical data packets. One embodiment of the decoder includes a plurality of waveguides, and semireflective elements that define, within each waveguide, a resonant cavity, each resonant cavity being of a different length. Addresses are encoded as equal spacings of sequences of optical pulses. An address to be decoded is directed simultaneously to all waveguides. Resonance is set up only in the waveguide whose resonant cavity matches the optical pulse spacing of the address. Another embodiment of the decoder includes a plurality of waveguides of different lengths, with the length difference between adjacent waveguides corresponding to a certain propagation time interval. Each waveguide terminates in an optoelectronic detector. Addresses are encoded as patterns of bits spaced according to this propagation time interval, with optical pulses representing "1" bits. An address to be decoded is directed, bit by bit, simultaneously to all waveguides. When the last bit of the address reaches the end of the shortest waveguide, each of the other bits reaches the end of a correspondingly longer waveguide. The encoded address is reflected in the consequent activation pattern of the detectors.

18 Claims, 6 Drawing Sheets

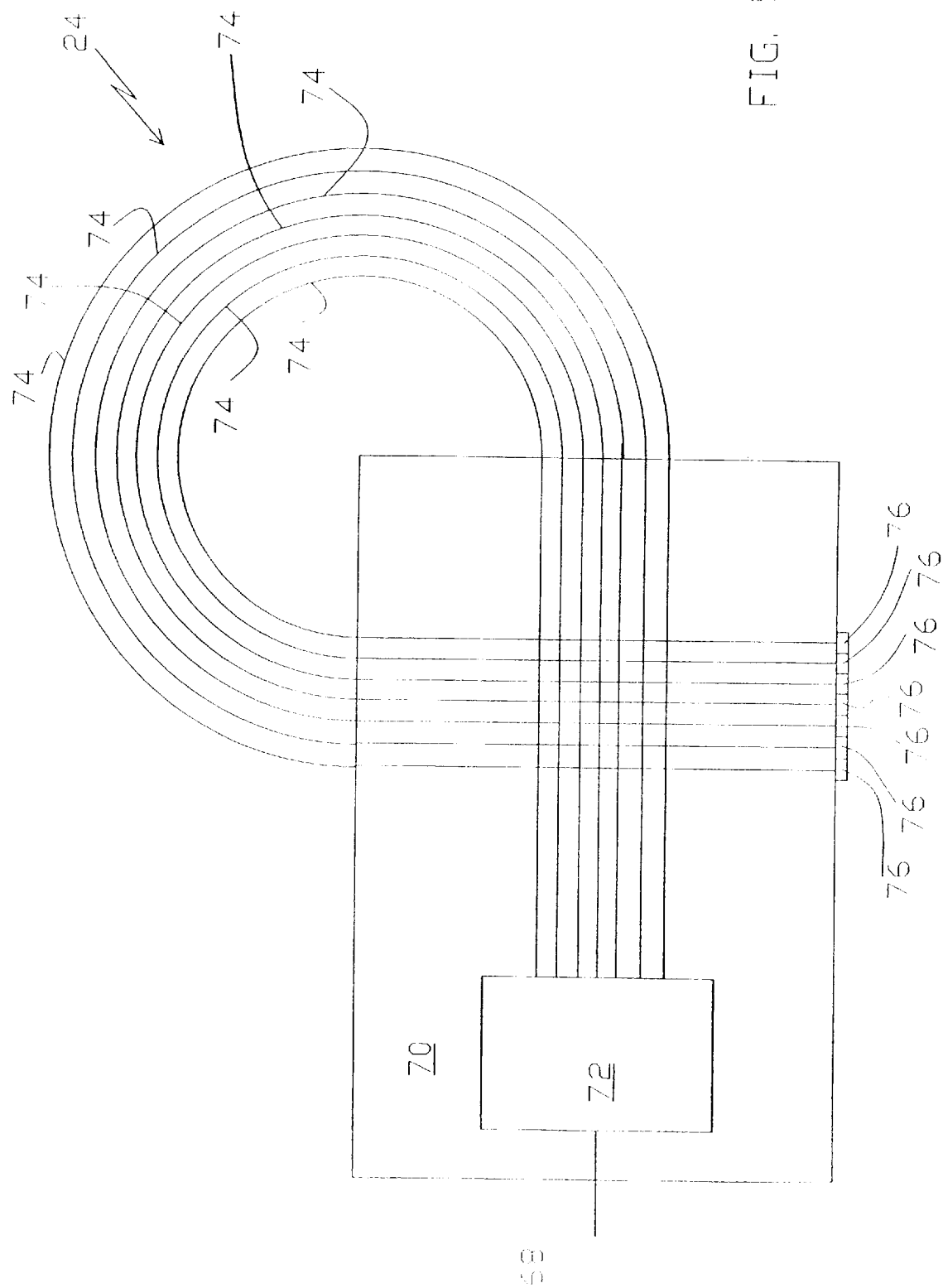

OPTICAL ADDRESS DECODER

FIELD AND BACKGROUND OF THE INVENTION

The present invention relates to optical data transmission and, more particularly, to an optical data packet address decoder and corresponding address formats.

There are two kinds of digital communications networks in common use: electronic and optical. Optical data transmission has the advantage over electronic data transmission of relative immunity to interference and crosstalk and a significantly higher bandwidth. For several messages to share the same physical communications channel, the messages must be multiplexed. Several multiplexing schemes are commonly used in electronic networks, including time division multiplexing (TDM), frequency division multiplexing (FDM) and code division multiplexing (CDM). FDM is straightforward to implement in an optical network, where it is also commonly referred to as "wavelength division multiplexing" (WDM): each message is assigned its own carrier wavelength, and simple wavelength-sensitive optical components such as diffraction gratings are used to sort out the different messages. Several papers were presented at the 1998 Conference on Lasers and Electro-Optics (San Francisco Calif., May 3–8) on optical TDM and CDM implementations.

In both electronic and optical networks, all but the shortest messages are transmitted as several discrete packets, according to a variety of well-known protocols such as TCP/IP. FIG. 1 shows a typical format of a data packet 10: an address block 14, which indicates the destination of data packet 10 by having a destination address encoded therein, followed by a data block 12 wherein the portion of the message contained in data packet 10 is encoded. The convention in FIG. 1, and in other Figures below, is that data packets are transmitted from left to right, so that, for example, address block 14 reaches a destination node in a network before data block 12. Both the address and the message are encoded digitally, as sequences of regularly spaced electronic or optical pulses, with, for example, the presence of a pulse indicating a binary 1 and the absence of a pulse indicating a binary 0. The first bit of address block 14 is on the right side of address block 14, followed by the rest of the bits of address block 14, and similarly for data block 12. Both address block 14 and data block 12 have fixed and known transmission times. Typically, address block 14 and data block 12 both are formatted with a fixed number of bits, and their transmission times are the number of bits multiplied by the time interval associated with one bit; but, as will be seen below, other address block formats are possible. Typically, there is a time delay between the end of address block 14 and the beginning of data block 12.

SUMMARY OF THE INVENTION

FIG. 2 is a block diagram of an optical address decoding system 20, of which the device of the present invention is one component. Single arrows indicate the flow of optical data. Double arrows indicate the flow of electronic data. System 20 enables the implementation of time division multiplexing in an optical transmission network. A data packet 10 enters system 20 from an input channel 34. A 1×2 switch 22 diverts address block 14 to the left branch of FIG. 2 and data block 12 to the right branch of FIG. 2. Address block 14 is decoded in a decoder 24. According to the decoded address, an electronic signal is sent to a switch control 33 instructing switch control 33 to set a switch array 32 to direct data packet 10 to one of a plurality of output channels 36. Because the decoding process in decoder 24 destroys, or at least rearranges, address block 14, the decoded address is sent to an address restoration unit 26 which reconstructs address block 14. Depending on the type of optical network, the reconstructed address block 14 may or may not be identical to address block 14 that was input to decoder 24. Meanwhile, data block 12 is transmitted along the right branch of FIG. 2. Optionally, a delay unit 30 is provided to retard the transmission of data block 12 for the amount of time needed to decode and reconstruct address block 14, to preserve the built-in delay between address block 14 and data block 12. Finally, address block 14 and data block 12 merge to reconstruct data packet 10, which enters switch array 32 and then exits switch array 32 along the appropriate output channel 36. The device of the present invention is an improved embodiment of decoder 24.

Therefore, according to the present invention there is provided a device for decoding an address block, of an optical data packet, wherein is encoded one of a plurality of addresses, including: (a) a plurality of waveguides; (b) a splitting mechanism for directing the address block simultaneously to each of the waveguides; and (c) for each of the waveguides, a detector for detecting light propagating in the each waveguide.

Furthermore, according to the present invention there is provided a method of routing optical data packets, including the steps of: (a) providing each data packet with an address block wherein is encoded one of a plurality of addresses; (b) providing a plurality of waveguides; (c) directing the address block simultaneously to each of the waveguides; (d) detecting an intensity of light propagating in each the waveguide as a result of the directing of the address block to each the waveguide; and (e) inferring the address from at least one of the intensities.

The device of the present invention simultaneously directs address block 14 to a plurality of waveguides. Each waveguide terminates in a detector. The physical properties of each waveguide, for example, the length of each waveguide, determine the propagation characteristics of the light in the waveguide. Each waveguide is configured so that the light is propagated within each waveguide in a manner unique to that waveguide. For example, if the waveguides have different lengths, a particular pulse of address block 14 reaches the detectors at different times. The address encoded in address block 14 is inferred from the pattern of activation of the detectors by the light propagating in the waveguides.

Like WDM, the method of the present invention is compatible with communications protocols that have low synchronicity requirements. However, the present invention supports TDM, and can be used to implement a variety of transmission modes, such as ATM (asynchronous transmission mode).

According to one preferred embodiment of the present invention, the waveguides are configured as resonant cavities. The address formatting appropriate to this embodiment is a series of equally spaced pulses, with the address encoded as the pulse spacing. Each cavity resonates at a different pulse spacing. Only the detector whose waveguide resonates in response to a particular address block 14 is activated.

According to another preferred embodiment of the present invention, the address is formatted conventionally, as regularly spaced bits, and the length difference between successive waveguides is the distance that light propagates in the waveguides during the time interval associated with one bit. The outputs from the detectors are directed, with equal delays, to individual gates of appropriately configured gate arrays, so that only one gate array, corresponding to a particular address, is activated by a particular address block 14.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an optical address decoder, and associated methodology, which can be used to implement TDM or ATM in an optical data communications network.

The principles and operation of optical address decoding according to the present invention may be better understood with reference to the drawings and the accompanying description.

Figure 1:
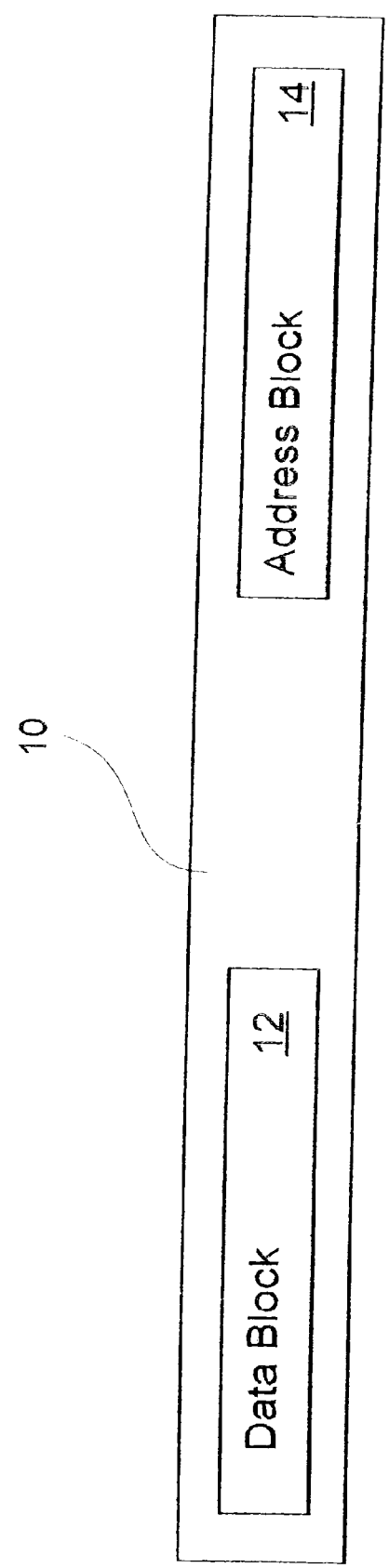
FIG. 1 shows the format of an optical data packet.
Figure 2:
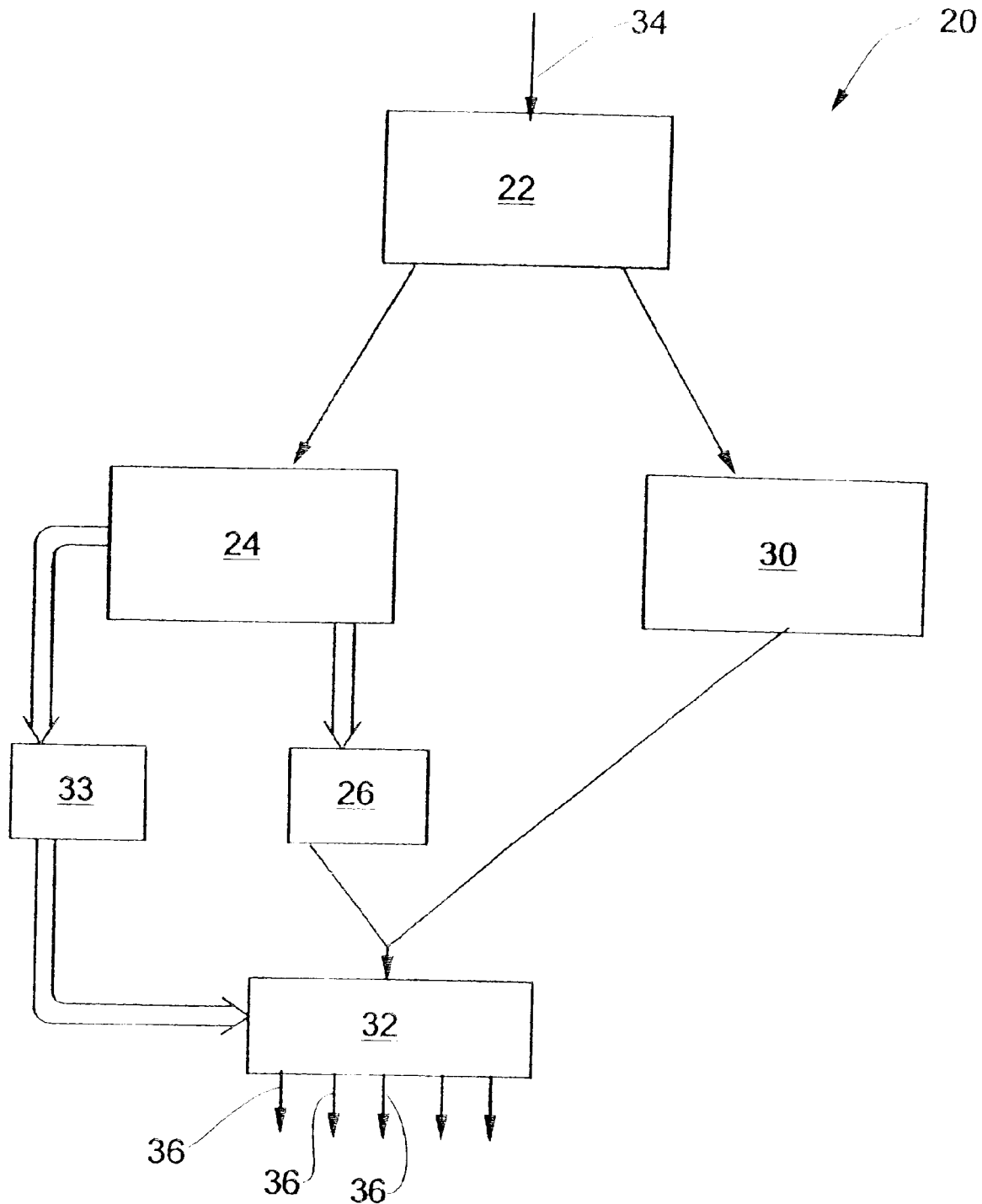
FIG. 2 is a block diagram of an optical address decoding system.
Figure 3:
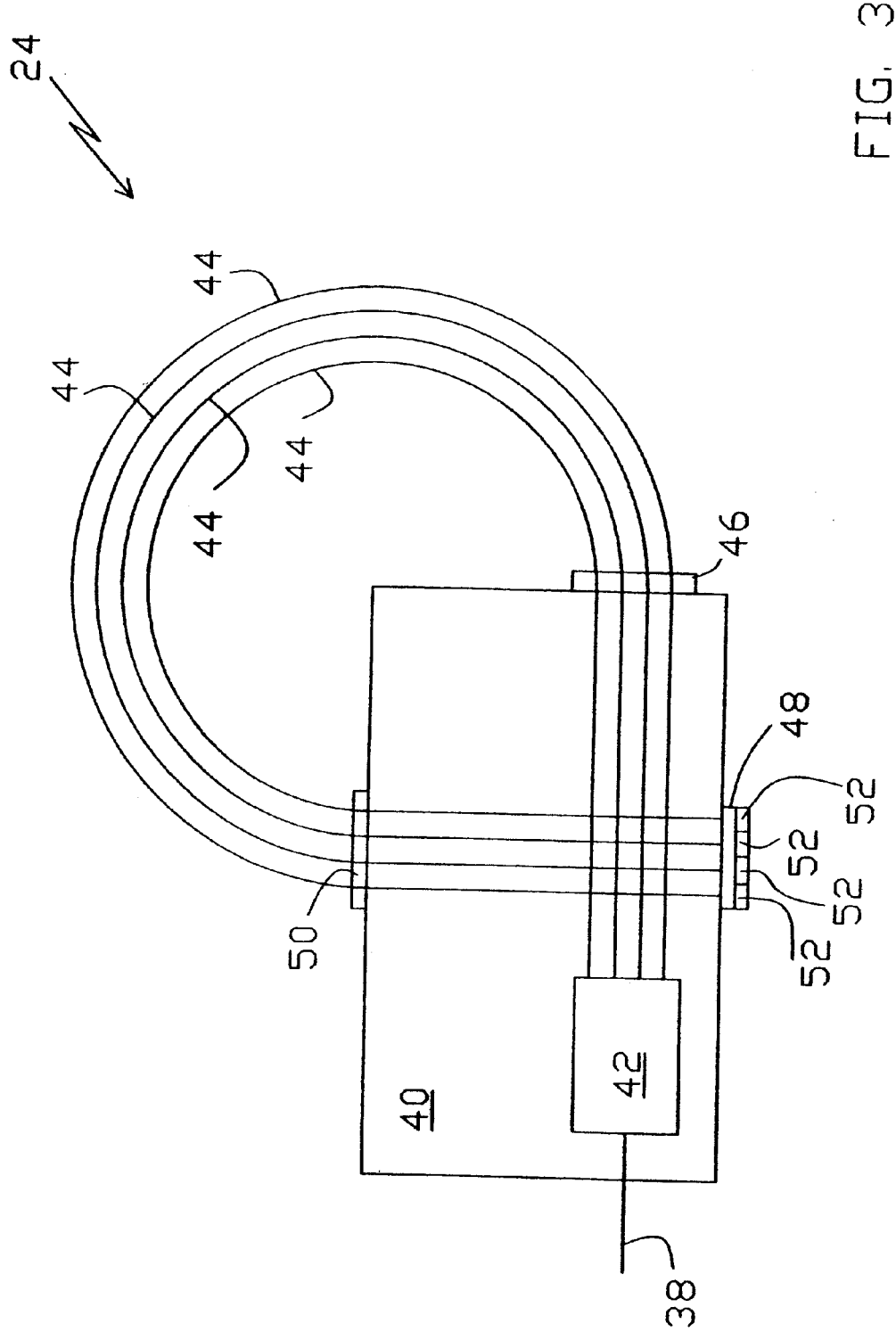
FIG. 3 illustrates a first variant of a first preferred embodiment of the decoder of the present invention.

Referring again to the drawings, FIG. 3 illustrates a first variant of a first preferred embodiment of decoder 24 of the present invention. This embodiment of decoder 24 is based on four waveguides 44, which are partly fabricated on an integrated optics chip 40 by standard methods and partly implemented outside chip 40 as optical fibers. An input waveguide 38 introduces incoming optical signals to a multimode interference splitter 42, which splits the signals among waveguides 44. Waveguides 44 leave chip 40 at a semireflective layer 46 and return to chip 40 at an antireflective layer 50. Each waveguide 44 is coupled to a corresponding optoelectronic detector 52 at another semireflective layer 48. Each optoelectronic detector 52 produces a voltage that is proportional to the intensity of the light incident thereon. Note that waveguides 44 all are of different lengths. Semireflective layers 46 and 48 define, in each waveguide 44, a resonant cavity, each resonant cavity being of a different length. Not shown in FIG. 3 is the processing electronics associated with detectors 52. Only four waveguides 44 are shown in FIG. 3 for illustrational simplicity. A more typical number of waveguides 44 is between 8 and 16.

The use of multimode interference splitter 42 in decoder 24 to split the incoming signals among waveguides 44 is illustrative, not obligatory. Other kinds of optical components, for example, a cascaded y-splitter, may be used for this purpose.

The basic address format appropriate to decoder 24 of FIG. 3 is a sequence of equally spaced optical pulses, with the destination address represented by the spacing between pulses. The lengths of the resonant cavities are chosen so that the optical path length in each resonant cavity is an integral or half-integral multiple of the optical path distance traveled by the light in waveguides 44 during the time corresponding to one interpulse spacing of one of the addresses. For a given address, as each pulse enters the resonant cavities, it is partly reflected at semireflective layers 46 and 48. In the resonant cavity whose optical path length corresponds to the interpulse spacing of the given address, successive pulses coincide and reinforce each other inside the resonant cavity. In the other resonant cavities, successive pulses do not coincide and do not reinforce each other. Detectors 52 are selected to have response times on the order of the pulse widths. The signal produced by the detector 52, associated with the resonant cavity whose optical path length corresponds to the interpulse spacing of the given address, has a periodicity related to the interpulse spacing and a maximum value significantly greater than the signal produced by one pulse. The signals produced by the other detectors 52 have no such periodicity and have maxima on the order of the signal produced by one pulse. The processing electronics associated with detectors 52 monitors the signals produced by detectors 52 and identifies which of detectors 52 is producing signals characteristic of resonance. The address associated with this detector is the address that is encoded in address block 14 that entered decoder 24 of FIG. 3 via input waveguide 38.

For example, in a 10 GHz optical data transmission network, with pulses whose duration is on the order of 0.1 nanoseconds, seven different addresses can be encoded as trains of pulses with seven different interpulse spacings on the order of 2 nanoseconds, corresponding to address frequencies on the order of 500 MHz, with 20 MHz spacings between the address frequencies. The following table shows feasible address frequencies and corresponding resonant cavity lengths for waveguides 44 made of silica and carrying light of wavelength 1550 nm, at which wavelength the index of refraction of silica is about 1.5. The lengths shown correspond to two interpulse spacings.

| channel | address frequency (MHz) | cavity length (mm) |
|---|---|---|
| 1 | 440 | 227 |
| 2 | 460 | 217 |
| 3 | 480 | 208 |
| 4 | 500 | 200 |
| 5 | 520 | 192 |
| 6 | 540 | 185 |
| 7 | 560 | 178 |

Conventional methods of fabricating integrated optics chips are sufficiently accurate, geometrically, to give waveguides 44 the proper lengths with respect to pulse timing. Nevertheless, higher accuracy than this is needed to ensure that overlapping pulses actually reinforce each other and do not interfere destructively. It is necessary that overlapping pulses be in phase with each other, preferably to within about one degree of phase. To achieve this level of accuracy requires active tuning of the indices of refraction of the portions of waveguides 44 that lie on chip 40. These indices of refraction may be modulated thermally in thermo-optic materials such as silica and ion glass, or electronically in electro-optic materials such as lithium niobate and gallium arsenide.

In a more sophisticated addressing scheme, some addresses are associated with superpositions of several sequences of equally spaced pulses, each sequence with a slightly different interpulse spacing. Under this scheme, these addresses produces resonance conditions in two or more resonant cavities, and trigger resonance condition responses in two or more detectors 52. Under this scheme, the four waveguide 44 embodiment of FIG. 3 accommodates fifteen different addresses.

Figure 4:
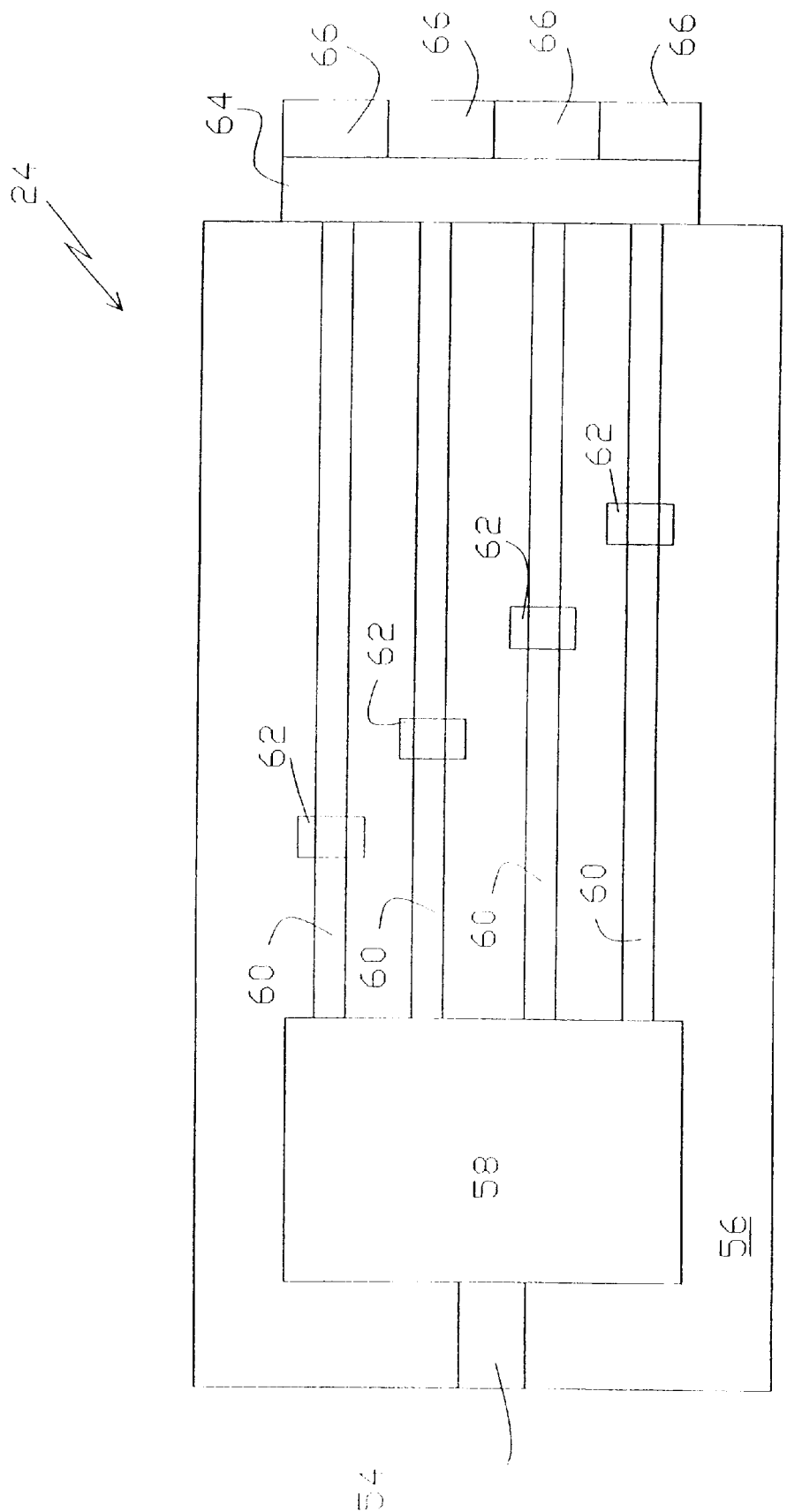
FIG. 4 illustrates a second variant of the first preferred embodiment of the decoder of the present invention.

FIG. 4 illustrates a second variant of the first preferred embodiment of decoder 24 of the present invention, suitable for higher frequency communications than the variant of FIG. 3. Unlike the variant of FIG. 3, the variant of FIG. 4 has waveguides 60 thereof fabricated entirely on an integrated optics chip 56. As in the case of the variant of FIG. 3, an input waveguide 54 leads to a multimode interference splitter 58 which splits incoming optical signals among waveguides 60. Each waveguide 60 is coupled to a corresponding optoelectronic detector 66 at a semireflective layer 64. Each waveguide 60 is provided with a semireflective trench mirror 62, thereby defining, between that trench mirror 62 and semireflective layer 64, a resonant cavity. Trench mirrors 62 are positioned at different distances from semireflective layer 64, so that the resonant cavities all have different lengths. As in FIG. 3, the processing electronics associated with detectors 66 is not shown. Only four waveguides 60 are shown in FIG. 4 for illustrational simplicity. A more typical number of waveguides 60 is between 8 and 16.

The variant of FIG. 4 functions substantially the same as the variant of FIG. 3, but at a higher frequency. For example, in a 50 GHz optical data transmission network, with pulses whose duration is on the order of 0.02 nanoseconds, seven different addresses can be encoded as trains of pulses with seven different interpulse spacings on the order of 0.5 nanoseconds, corresponding to address frequencies on the order of 2 GHz, with 50 MHz spacings between the address frequencies. The following table shows feasible address frequencies and corresponding resonant cavity lengths for waveguides 60 made of lithium niobate and carrying light of wavelength 1550 nm, at which wavelength the index of refraction of lithium niobate is about 2.15. As in the case of the variant of FIG. 3, the lengths shown correspond to two interpulse spacings.

| channel | address frequency (GHz) | cavity length (mm) |
| --- | --- | --- |
| 1 | 2.15 | 32.6 |
| 2 | 2.10 | 33.3 |
| 3 | 2.05 | 34.1 |
| 4 | 2.00 | 35.0 |
| 5 | 1.95 | 35.9 |
| 6 | 1.90 | 36.8 |
| 7 | 1.85 | 37.8 |

FIG. 5 illustrates the second preferred embodiment of decoder 24 of the present invention. As in the embodiment of FIG. 3, the embodiment of FIG. 5 is based on seven waveguides 74 that are partly fabricated on an integrated optics chip 70 by standard methods and partly implemented outside chip 70 as optical fibers. An input waveguide 68 introduces incoming optical signals to a multimode interference splitter 72, which splits the signals among waveguides 74. Each waveguide 74 terminates at an optoelectronic detector 76. Unlike the embodiments of FIGS. 3 and 4, the embodiment of FIG. 5 includes no semireflective layers and no semireflective elements. Instead, the lengths of adjacent waveguides 74 are chosen to differ by a uniform length increment corresponding to a certain propagation time $\Delta$ through the material of waveguides 74. Thus, if two signals enter two adjacent waveguides 74 at the same time, the signal traveling through the longer of the two waveguides 74 arrives at the corresponding detector 76 delayed by $\Delta$ relative to the signal that travels through the shorter of the two waveguides 74.

Figure 5B:
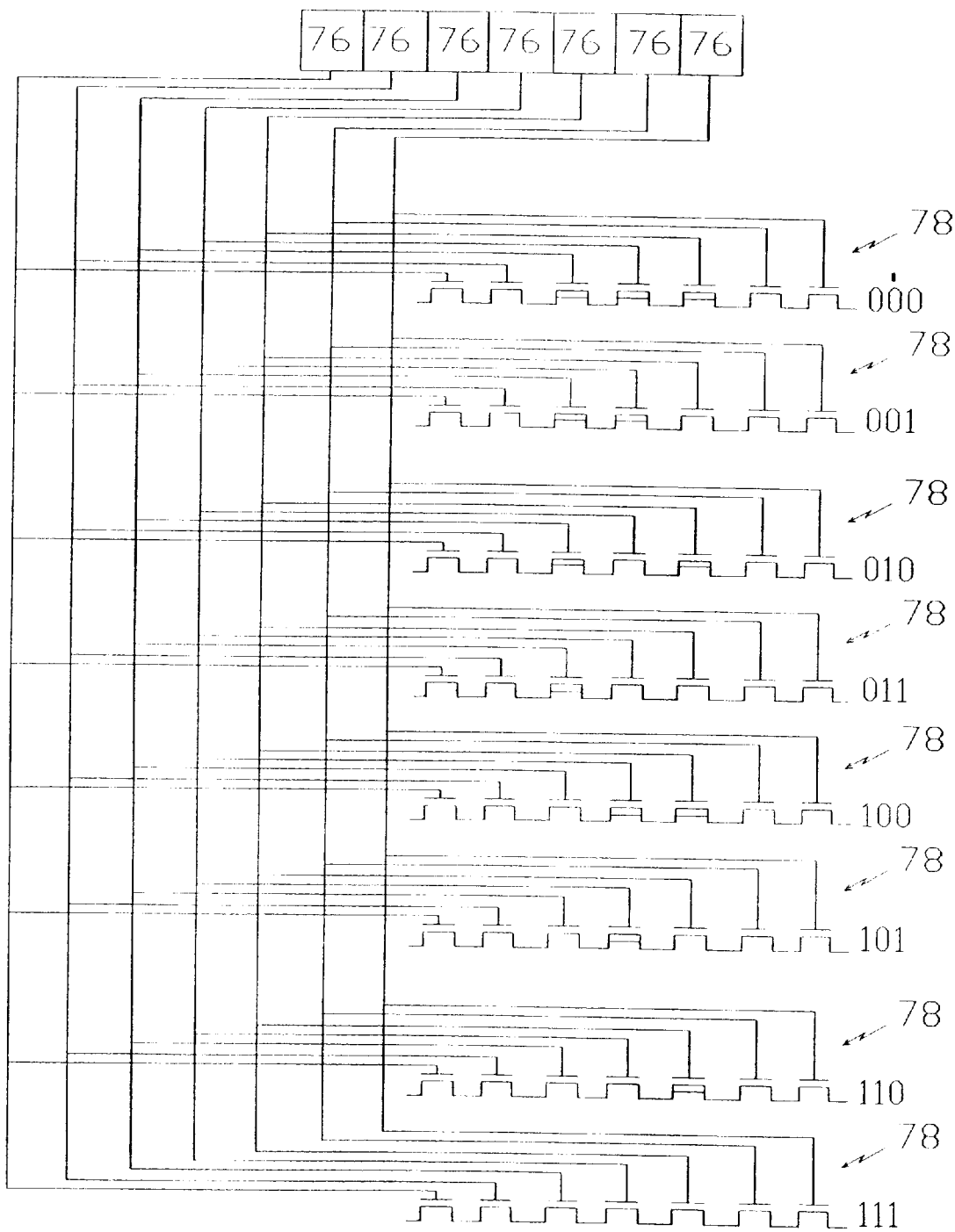
FIG. 5 illustrates a second preferred embodiment of the decoder of the present invention.

The address format appropriate for the embodiment of FIG. 5 is a string of bits consisting of an address head of consecutive 1's, an address body containing the address proper represented as a binary number, and an address tail of consecutive 1's. FIG. 5B shows an electronic circuit for decoding a simple set of such addresses, specifically, addresses of the form "11xxx1", where the x's represent either 0 or 1, so that this set includes eight addresses in all. Each detector 76 is connected to the gate of a corresponding MOS transistor in each of eight AND gate arrays 78. Each AND gate array 78 includes seven MOS transistors in series. In each AND gate array, the first, second, sixth and seventh MOS transistors are n-channel transistors. The third, fourth and fifth MOS transistors are either n-channel transistors or p-channel transistors, depending on the address that each AND gate array 78 is intended to respond to, with n-channel transistors corresponding to 1's and p-channel transistors corresponding to 0's. Each and gate array 78 is labeled by the three-bit address to which it responds. The electrical paths from detectors 76 to the MOS transistors of each AND gate array 78 are all of equal lengths, so that the voltage pulses, from detectors 76, that represent simultaneously arriving optical pulses, arrive at that AND gate array 78 simultaneously.

Each bit of these addresses is encoded in address block 14 as either the presence (1) or the absence (0) of an optical pulse. The time interval between successive bits is equal to $\Delta$. Consider, then, what happens when an address block 14 containing the address "1101111" traverses decoder 24 of FIG. 5. As each bit of address block 14 arrives at multimode interference splitter 72, the bit is directed simultaneously into all of waveguides 74. The first optical pulse, representing the first "1" of the address head, arrives successively at each detector 76 at arrival times that differ, from right to left, by $\Delta$. The second optical pulse, representing the second "1" of the address head, arrives successively at each detector 76, also at arrival times that differ, from right to left, by $\Delta$, delayed, at each detector 76, by $\Delta$ relative to the first optical pulse, so that when the first optical pulse reaches the second detector 76 from the right, the second optical pulse reaches the rightmost detector 76. Whenever an optical pulse reaches a detector 76, that detector 76 emits a voltage pulse. At successive time intervals $\Delta$, the response of the array of detectors 76 is as follows, with "1" representing a voltage pulse and "0" representing the absence of a voltage pulse:

| time interval | detector responses | | | | | | |
| --- | --- | --- | --- | --- | --- | --- | --- |
| 1  | 0 | 0 | 0 | 0 | 0 | 0 | 1 |
| 2  | 0 | 0 | 0 | 0 | 0 | 1 | 1 |
| 3  | 0 | 0 | 0 | 0 | 1 | 1 | 1 |
| 4  | 0 | 0 | 0 | 1 | 1 | 1 | 1 |
| 5  | 0 | 0 | 1 | 1 | 1 | 1 | 0 |
| 6  | 0 | 1 | 1 | 1 | 1 | 0 | 1 |
| 7  | 1 | 1 | 1 | 1 | 0 | 1 | 1 |
| 8  | 1 | 1 | 1 | 0 | 1 | 1 | 0 |
| 9  | 1 | 1 | 0 | 1 | 1 | 0 | 0 |
| 10 | 1 | 0 | 1 | 1 | 0 | 0 | 0 |
| 11 | 0 | 1 | 1 | 0 | 0 | 0 | 0 |
| 12 | 1 | 1 | 0 | 0 | 0 | 0 | 0 |
| 13 | 1 | 0 | 0 | 0 | 0 | 0 | 0 |

Only in the seventh time interval do the first, second, sixth and seventh detectors 76 emit voltage pulses. Therefore, only in the seventh time interval is any of AND gate arrays 78 activated, and then only one AND gate array 78, specifically, the seventh AND gate array 78, labeled "110" in FIG. 5B, is activated.

The purpose of the head and tail bits is to make sure that no AND gates are activated except in the seventh time interval. The seventh time interval is the only time interval when voltage pulses are delivered simultaneously to the first, second, sixth and seventh MOS transistors of AND gate arrays 78. As noted above, these MOS transistors are n-channel transistors in all eight AND gate arrays 78. Which of the eight AND gate arrays 78 is activated during the seventh time interval is determined by the bit pattern of the address body.

The example presented above, with two head bits and two tail bits, is illustrational. Any convenient number of head bits or tail bits may be used, either the address head or the address tail may be omitted, and the address head and tail may be separated from the address body by dummy bits. In general, one ordinarily skilled in the art is able to select the address format that provides optimal robustness with respect to noise in a specific network environment.

The electronic circuit of FIG. 5B is illustrative. As is well-known in the art, other types of circuits, for example, a demultiplexer, may be connected to detectors 76 and configured to respond in a unique manner to each of the addresses encoded in address block 14.

Decoding system 20 routes only one input data packet 10 at a time, from one input channel 34, to one of several output channels 36. A similar system can be constructed, based on several decoders 24 of the present invention, that routes several data packets 10 simultaneously from several input channels to several output channels. This system must include a collision prevention mechanism to arbitrate between two input data packets 10 that need to be directed simultaneously to the same output channel.

The second preferred embodiment of decoder 24 is compatible with all multiplexing schemes. The first preferred embodiment of decoder 24 also is compatible with all multiplexing schemes in principle, but is difficult to integrate with WDM, because waveguides 44 or 60 must be re-tuned to the address frequency of each incoming optical data packet. This re-tuning is too slow for practical implementation.

While the invention has been described with respect to a limited number of embodiments, it will be appreciated that many variations, modifications and other applications of the invention may be made.

What is claimed is:

1. A device for decoding an address block, of an optical data packet, wherein is encoded one of a plurality of addresses, comprising:
   (a) a plurality of waveguides;
   (b) a splitting mechanism for directing the address block simultaneously to each of said waveguides;
   (c) for each of said waveguides, a detector for detecting light propagating in said each waveguide; and
   (d) a first semireflective layer transverse to said waveguides between said splitting mechanism and said detectors.

2. The device of claim 1, wherein said splitting mechanism includes a multimode interference splitter.

3. The device of claim 1, wherein said splitting mechanism includes a cascaded y-splitter.

4. The device of claim 1, further comprising:
   (e) for each of said waveguides, a semireflective element, said semireflective element and said first semireflective layer defining between them a resonant cavity;
   each of said resonant cavities having a different optical path length.

5. The device of claim 4, wherein said semireflective elements are included in a second semireflective layer transverse to said waveguides between said splitting mechanism and said first semireflective layer.

6. The device of claim 4, wherein each of said semireflective elements includes a trench mirror.

7. The device of claim 1, wherein each of said waveguides has a different optical path length.

8. A device for decoding an address block, of an optical data packet, wherein is encoded one of a plurality of addresses, comprising:
   (a) a plurality of waveguides, each said waveguide having a different optical path length;
   (b) a splitting mechanism for directing the address block simultaneously to each of said waveguides; and
   (c) for each of said waveguides, a detector for detecting light propagating in said each waveguide.

9. A device for decoding an address block, of an optical data packet, wherein is encoded one of a plurality of addresses, comprising:
   (a) a plurality of waveguides;
   (b) a splitting mechanism for directing the address block simultaneously to each of said waveguides;
   (c) for each of said waveguides, a detector for detecting light propagating in said each waveguide; and
   (d) an electronic mechanism responsive to said detectors in a different manner for each of the addresses.

10. The device of claim 9, wherein said electronic mechanism includes a plurality of gate arrays, equal in number to the addresses, and wherein, for each said gate array, each gate of said each gate array is coupled to a unique one of said detectors, so that each said gate array produces a verification signal only in response to a unique one of the addresses.

11. The device of claim 10, wherein said gates are AND gates.

12. The device of claim 9, wherein said electronic mechanism includes a demultiplexer.

13. A method of routing optical data packets, comprising the steps of:
   (a) providing each data packet with an address block wherein is encoded one of a plurality of addresses;
   b) providing a plurality of waveguides;
   (c) directing said address block simultaneously to each of said waveguides;
   (d) detecting an intensity of light propagating in each said waveguide as a result of said directing of said address block to each said waveguide; and
   (e) inferring said address from at least one of said intensities.

14. The method of claim 13, wherein each of said addresses is encoded as a superposition of at least one sequence of pulses of equal spacing, each said sequence having a different said pulse spacing.

15. The method of claim 14, wherein said waveguides are configured as resonant cavities, each of said cavities being tuned to only one of said pulse spacings.

16. The method of claim 13, wherein each of said address blocks includes:
   (i) a trigger portion, and
   (ii) a body portion, wherein said one address is encoded.

17. The method of claim 16, wherein said inferring of said address is effected only in response to said detecting of said intensities corresponding to said trigger portion.

18. The method of claim 16, wherein said trigger portion includes:
   (A) a head portion preceding said body portion, and
   (B) a tail portion following said body portion.

* * * * *

UNITED STATES PATENT AND TRADEMARK OFFICE
CERTIFICATE OF CORRECTION

PATENT NO.: 6,160,652
DATED: December 12, 2000
INVENTOR(S): David NIR It is certified that error appears in the above-identified patent and that said Letters Patent is hereby corrected as shown below:

Change the name of the Assignee to: Lynx Photonic Networks Inc.

Signed and Sealed this

Twenty-fourth Day of April, 2001

*Attest:*

NICHOLAS P. GODICI

*Attesting Officer*   *Acting Director of the United States Patent and Trademark Office*